(12) United States Patent
Tano et al.

(10) Patent No.: US 10,141,017 B2
(45) Date of Patent: Nov. 27, 2018

(54) LUBRICANT FOR MAGNETIC RECORDING MEDIUM, AND MAGNETIC RECORDING MEDIUM

(71) Applicant: Dexerials Corporation, Tokyo (JP)

(72) Inventors: Nobuo Tano, Tokyo (JP); Kouki Hatsuda, Tokyo (JP); Hirofumi Kondo, Tokyo (JP)

(73) Assignee: Dexerials Corporation, Tokyo (JP)

( * ) Notice: Subject to any disclaimer, the term of this patent is extended or adjusted under 35 U.S.C. 154(b) by 0 days.

(21) Appl. No.: 15/548,335

(22) PCT Filed: Feb. 3, 2016

(86) PCT No.: PCT/JP2016/053275
§ 371 (c)(1),
(2) Date: Aug. 2, 2017

(87) PCT Pub. No.: WO2016/125840
PCT Pub. Date: Aug. 11, 2016

(65) Prior Publication Data
US 2018/0025748 A1    Jan. 25, 2018

(30) Foreign Application Priority Data

Feb. 6, 2015   (JP) .................................. 2015-022262
Jul. 24, 2015  (JP) .................................. 2015-146732

(51) Int. Cl.
*G11B 5/84*      (2006.01)
*G11B 5/725*     (2006.01)
(Continued)

(52) U.S. Cl.
CPC ........... *G11B 5/725* (2013.01); *C10M 105/54* (2013.01); *C10M 105/58* (2013.01);
(Continued)

(58) Field of Classification Search
CPC .................. C10M 105/54; C10M 105/58; C10M 105/60; C10M 105/42; C10M 159/12;
(Continued)

(56) References Cited

U.S. PATENT DOCUMENTS 5,453,539 A    9/1995  Kondo et al.
2013/0053287 A1*  2/2013  Honda ................. C10M 171/00
                                                                 508/284
(Continued)

FOREIGN PATENT DOCUMENTS

JP    H06-041564    2/1994
JP    2003-113388   4/2003
(Continued)

OTHER PUBLICATIONS

Certified foreign priority document JP 2015-146732.*
Bhushan, B., "Tribiology and Mechanics of Magnetic Storage Devices", 2nd Edition, Springer, 1996, pp. 630-633.

*Primary Examiner* — James C Goloboy
(74) *Attorney, Agent, or Firm* — Carmody Torrance Sandak & Hennessey LLP (57) ABSTRACT

A lubricant for a magnetic recording medium including an ionic liquid including a Bronsted acid and a Bronsted base that is primary amine as constituents of the ionic liquid, wherein the Bronsted acid includes a fluorine-containing chain, the Bronsted base includes a fluorine-containing chain that is a perfluoroalkyl chain or a perfluoropolyether chain, wherein the fluorine-containing chain in the Bronsted acid is a perfluoropolyether chain or the fluorine-containing chain in the Bronsted base is the perfluoropolyether chain, or the fluorine-containing chain in the Bronsted acid is the perfluoropolyether chain and the fluorine-containing chain in the Bronsted base is the perfluoropolyether chain, and a (Continued)

number average molecular weight of the fluorine-containing chain in the Bronsted acid is 1,500 or less.

5 Claims, 1 Drawing Sheet

(51) Int. Cl.
| | |
|---|---|
| *C10M 105/54* | (2006.01) |
| *C10M 105/58* | (2006.01) |
| *C10M 105/60* | (2006.01) |
| *C10M 105/72* | (2006.01) |
| *C10M 171/00* | (2006.01) |

(52) U.S. Cl.
CPC ........ *C10M 105/60* (2013.01); *C10M 105/72* (2013.01); *C10M 171/00* (2013.01); *G11B 5/84* (2013.01); *C10M 2215/003* (2013.01); *C10M 2215/0425* (2013.01); *C10M 2219/0406* (2013.01); *C10N 2220/021* (2013.01); *C10N 2220/04* (2013.01); *C10N 2230/06* (2013.01); *C10N 2230/08* (2013.01); *C10N 2230/10* (2013.01); *C10N 2240/204* (2013.01); *C10N 2250/121* (2013.01)

(58) Field of Classification Search
CPC .......... C10M 171/00; C10M 2215/003; C10M 2215/0425; C10M 2219/0406; C10N 2220/021; C10N 2220/04; C10N 2230/04; C10N 2230/06; C10N 2230/08; C10N 2230/10; C10N 2240/204; C10N 2250/121; G11B 5/725; G11B 5/84
See application file for complete search history.

(56) References Cited

U.S. PATENT DOCUMENTS

2013/0089793 A1\* 4/2013 Gering ................ C07F 9/65815
  429/336
2015/0353558 A1 12/2015 Kondo et al.

FOREIGN PATENT DOCUMENTS

| JP | 2003-113389 | 4/2003 | |
|---|---|---|---|
| JP | 2009-242765 | 10/2009 | |
| JP | 2012-162693 | 8/2012 | |
| JP | H05-093059 | 12/2012 | |
| JP | 2015040244 A * | 3/2015 | .......... C10M 105/72 |

\* cited by examiner

FIG. 1

FIG. 2

LUBRICANT FOR MAGNETIC RECORDING MEDIUM, AND MAGNETIC RECORDING MEDIUM

TECHNICAL FIELD

The present invention relates to a lubricant for a magnetic recording medium, and a magnetic recording medium using the lubricant.

BACKGROUND ART

In recent years, it is desired to transmit, process, and store a large volume of information because of development of a highly sophisticated information society. It is said that the data volume generated per year around the world is 1 zettabyte (1,000,000,000 times 1 TB). As recording media for storing the large volume of data, magnetic recording media (e.g., magnetic tapes and magnetic disks), in each of which a magnetic layer is formed on or above a non-magnetic support, have attracted attentions. Since magnetic recording media can store a large volume of data, and can record and reproduce at high speed compared to optical disks, further development of performances of the magnetic recording media has been desired.

In order to improve a recording capacity and processing speed of a magnetic recording medium, for example, a magnetic disk, it is necessary to convert recording-reproducing magnetic fields into electrical signals. To this end, a floating amount of a magnetic head, which is a gap between the head and a disk, needs to be reduced. When the floating amount of the magnetic head is reduced, on the other hand, a friction force between the magnetic heat and the disk increases to abrade each other, which lowers reliability of the magnetic disk. Therefore, a lubricant layer including a lubricant is generally formed on the magnetic layer. In order to realize high reliability of a magnetic disk, it is important to design a lubricant that can maintain excellent lubricity even when the disk is repeatedly slid.

Properties desired for a lubricant of a magnetic recording medium include being a liquid in a wide temperature range, low vapor pressure, high thermal stability, high oxidation stability, low surface tension, and excellent friction properties. As a chemical structure satisfying the above-described properties, perfluoropolyether (PFPE) having a polar group at a terminal has been used (see, for example, NPL 1).

Other than that, ionic liquid-based lubricants each having a perfluoropolyether structure have been proposed for the purpose of improving thermal stability, friction properties, etc., (see, for example, PTLs 1 to 4).

However, a further reduction in a thickness of a lubricant layer is desired along with an increase in recording density of a magnetic recording medium, which is expected in the future. A lubricant that can be applied for such a thin-film lubricant layer has not yet been obtained.

CITATION LIST

Patent Literature

PTL 1: Japanese Patent Application Laid-Open (JP-A) No. 05-93059
PTL 2: JP-A No. 06-41564
PTL 3: JP-A No. 2003-113388
PTL 4: JP-A No. 2003-113389

Non Patent Literature

NPL 1: B. Bhushan, Tribology and Mechanics of Magnetic Storage Device, Springer (1996)

SUMMARY OF INVENTION

Technical Problem

The present invention aims to solve the above-described various problems existing in the art, and to achieve the following object. Specifically, the present invention has an object to provide a lubricant for a magnetic recording medium, which has excellent thermal stability and friction properties, even when a lubricant layer having a small thickness is formed, and to provide a magnetic recording medium using the lubricant.

Solution to Problem

Means for solving the above-described problems are as follows.
<1> A lubricant for a magnetic recording medium, including:
an ionic liquid including a Bronsted acid and a Bronsted base that is primary amine as constituents of the ionic liquid,
wherein the Bronsted acid includes a fluorine-containing chain,
wherein the Bronsted base includes a fluorine-containing chain that is a perfluoroalkyl chain or a perfluoropolyether chain,
wherein the fluorine-containing chain in the Bronsted acid is a perfluoropolyether chain or the fluorine-containing chain in the Bronsted base is the perfluoropolyether chain, or the fluorine-containing chain in the Bronsted acid is the perfluoropolyether chain and the fluorine containing chain in the Bronsted base is the perfluoropolyether chain, and
wherein a number average molecular weight of the fluorine-containing chain in the Bronsted acid is 1,500 or less.
<2> The lubricant for a magnetic recording medium according to <1>,
wherein the number average molecular weight of the fluorine containing chain in the Bronsted acid is 500 or less.
<3> The lubricant for a magnetic recording medium according to <1> or <2>,
wherein the Bronsted acid is sulfonic acid including the fluorine-containing chain or sulfonyl imide including the fluorine-containing chain, and
wherein the Bronsted base is primary amine including the perfluoropolyether chain.
<4> The lubricant for a magnetic recording medium according to any one of <1> to <3>,
wherein a coefficient of dynamic friction of the lubricant is 0.30 or less.
<5> A magnetic recording medium including:
a non-magnetic support;
a magnetic layer on or above the non-magnetic support; and
the lubricant for a magnetic recording medium according to any one of <1> to <4>, on or above the magnetic layer.

Advantageous Effects of Invention

According to the present invention, the above-described various problems existing in the art can be solvent, and a lubricant for a magnetic recording medium, which has excellent thermal stability and friction properties, even when a lubricant layer having a small thickness is formed, and a magnetic recording medium using the lubricant can be provided.

DESCRIPTION OF EMBODIMENTS (Lubricant for Magnetic Recording Medium)

A lubricant for a magnetic recording medium of the present invention includes an ionic liquid, and may further include other components according to the necessity.

<Ionic Liquid>

The ionic liquid includes a Bronsted acid and a Bronsted base as constituents of the ionic liquid. Specifically, the ionic liquid is formed of a Bronsted acid and a Bronsted base.

The present inventors have diligently conducted researches in order to provide a lubricant for a magnetic recording medium, which has excellent thermal stability and friction properties, even when a lubricant layer having a small thickness is formed. As a result, the present inventors have found that a lubricant for a magnetic recording medium, which has excellent thermal stability and friction properties, can be obtained even when a lubricant layer having a small thickness is formed, when an ionic liquid included in the lubricant for a magnetic recording medium includes a Bronsted acid and a Bronsted base as constituents of the ionic liquid and satisfies the following structures 1 to 5.

Structure 1: The Bronsted acid includes a fluorine-containing chain.
Structure 2: The Bronsted base is primary amine.
Structure 3: The Bronsted base includes a fluorine-containing chain that is a perfluoroalkyl chain or a perfluoropolyether chain.
Structure 4: The ionic liquid satisfies either or both of that the fluorine-containing chain in the Bronsted acid is a perfluoropolyether chain and that the fluorine-containing chain in the Bronsted base is the perfluoropolyether chain.
Structure 5: A number average molecular weight of the fluorine-containing chain in the Bronsted acid is 1,500 or less.

<<Bronsted Acid>>

The Bronsted acid includes a fluorine-containing chain. The fluorine-containing chain does not include a hydrogen atom.

Examples of the fluorine-containing chain include fluorine atoms, perfluorinated hydrocarbon chains, and perfluoropolyether chains.

Examples of the perfluorinated hydrocarbon chains include perfluoroalkyl chains, and perfluoroalkylene chains.

In the case where the number of fluorine atoms in one chain of the Bronsted acid is 1, the fluorine-containing chain is composed of only the fluorine atom. In the case where the number of fluorine atoms in one chain of the Bronsted acid is 1, specifically, the fluorine atom is the fluorine-containing chain.

The fluorine-containing chain is preferably a fluorine-containing chain represented by General Formula (I-1) below in terms of solubility and friction properties.

General Formula (I-1)

In General Formula (I-1) above, x is an integer of 0 to 21. The lower limit of x is preferably 1 and more preferably 2. The upper limit of x is preferably 20, more preferably 11, and particularly preferably 10. Examples of a range of the x include the following ranges.
An integer of 0 to 21
An integer of 0 to 20
An integer of 0 to 11
An integer of 0 to 10
An integer of 1 to 21
An integer of 1 to 20
An integer of 1 to 11
An integer of 1 to 10
An integer of 2 to 21
An integer of 2 to 20
An integer of 2 to 11
An integer of 2 to 10

In the case where x is 0, a fluorine-containing chain represented by General Formula (I-1) above is a fluorine atom. In the case where x is 1 or greater, a fluorine-containing chain represented by General Formula (I-1) above is a perfluoroalkyl chain.

The perfluoropolyether chain is preferably a fluorine-containing chain represented by General Formula (I-2) below in view of solubility and friction properties.

General Formula (I-2)

$$F_3C\!-\!(CF_2)_m\!-\!(O\!-\!CF_2\!-\!CF_2)_n\!-\!O\!-\!$$

In General Formula (I-2) above, m is an integer of 1 to 10 and preferably an integer of 1 to 6; and n is an integer of 2 to 10 and preferably 2 to 6.

Examples of the Bronsted acid include carboxylic acid, sulfonic acid, and sulfonyl imide.

The carboxylic acid may be monocarboxylic acid or polyvalent carboxylic acid, but the carboxylic acid is preferably monocarboxylic acid.

The sulfonic acid may be monosulfonic acid or polyvalent sulfonic acid, but the sulfonic acid is preferably monosulfonic acid.

In the case where the Bronsted acid is monocarboxylic acid, the Bronsted acid preferably includes a carboxyl group (a carboxylic acid group, —COOH) at one terminal.

In the case where the Bronsted acid is monosulfonic acid group, the Bronsted acid preferably include a sulfo group (a sulfonic acid group, —SO$_3$H) at one terminal.

The Bronsted acid is preferably represented by any of General Formula (I-A) to General Formula (I-F) below in view of thermal resistance.

General Formula (I-A)

General Formula (I-B)

-continued

General Formula (I-C)

General Formula (I-D)

General Formula (I-E)

General Formula (I-F)

In General Formula (I-A) and General Formula (I-B) above, x is an integer of 0 to 21; and y is an integer of 0 to 6 and preferably an integer of 0 to 2. Examples of x in General Formula (I-A) and General Formula (I-B) above are the same as the examples of x in General Formula (I-1).

In General Formula (I-C) and General Formula (I-D), m is an integer of 1 to 10 and preferably an integer of 1 to 6; and n is an integer of 2 to 10 and preferably an integer of 2 to 6.

In General Formula (I-E), x1 and x2 are each independently an integer of 0 to 20. For example, examples of x1 and x2 include examples of x in General Formula (I-1) above.

In General Formula (I-F) above, x3 is an integer of 1 to 20 and preferably an integer of 1 to 10.

In General Formula (I-A) and General Formula (I-B) above, the —(CH$_2$)y- chain includes a hydrogen atom bonded to a carbon atom, and therefore the —(CH$_2$)y- chain is not included in the perfluoroalkyl chain. Specifically, the —(CH$_2$)y- chain is not part of the perfluoroalkyl chain.

In General Formula (I-C) above, the —CH$_2$OCH$_2$CH$_2$CH$_2$— chain includes a hydrogen atom bonded to a carbon atom, and therefore the —CH$_2$OCH$_2$CH$_2$CH$_2$-chain is not included in the perfluoropolyether chain. Specifically, the —CH$_2$OCH$_2$CH$_2$CH$_2$— chain is not part of the perfluoropolyether chain.

In the case where x1 and x2 are 0 in General Formula (I-E) above, each of fluorine atoms bonded to S independently constitutes a fluorine-containing chain.

A number average molecular weight (Mn) of the fluorine-containing chain in the Bronsted acid is 1,500 or less, preferably 500 or less, and more preferably 200 to 500.

For example, the number average molecular weight can be determined by $^{19}$F-NMR (Fluorine Nuclear Magnetic Resonance).

<<Bronsted Base>>

The Bronsted base includes a fluorine-containing chain that is a perfluoroalkyl chain or a perfluoropolyether chain. The fluorine-containing chain does not include a hydrogen atom.

The perfluoroalkyl chain is preferably a fluorine-containing chain represented by General Formula (II-1) below in view of solubility and friction properties.

General Formula (II-1)

In General Formula (II-1) above, x is an integer of 1 to 20 and preferably an integer of 1 to 10.

The perfluoropolyether chain is preferably a fluorine-containing chain represented by General Formula (II-2) below in view of solubility and friction properties.

General Formula (II-2)

In General Formula (II-2) above, m is an integer of 1 to 10 and preferably an integer of 1 to 6; and n is an integer of 2 to 10 and preferably an integer of 2 to 6.

The Bronsted base is primary amine.
The Bronsted base is preferably monoamine.
The Bronsted base is preferably represented by any of General Formula (II-A) to General Formula (II-B) below in view of thermal resistance.

General Formula (II-A)

General Formula (II-B)

In General Formula (II-A) above, x is an integer of 1 to 20 and preferably an integer of 1 to 10; and y is an integer of 0 to 6 and preferably an integer of 0 to 4.

In General Formula (II-B) above, m is an integer of 1 to 10 and preferably an integer of 1 to 6; and n is an integer of 2 to 10 and preferably an integer of 2 to 6.

In General Formula (II-A) above, the —(CH$_2$)y- chain includes a hydrogen atom bonded to a carbon atom, and therefore the —(CH$_2$)y- chain is not included in the perfluoroalkyl chain. Specifically, the —(CH$_2$)y- chain is not part of the perfluoroalkyl chain.

In General Formula (II-B) above, the —CH$_2$OCH$_2$CH$_2$— chain includes a hydrogen atom bonded to a carbon atom, and therefore the —CH$_2$OCH$_2$CH$_2$— chain is not included in the perfluoropolyether chain. Specifically, the —CH$_2$OCH$_2$CH$_2$— chain is not part of the perfluoropolyether chain.

It is preferred that in the ionic liquid, the Bronsted acid be sulfonic acid including the fluorine-containing chain or sulfonyl imide including the fluorine-containing chain, and the Bronsted base be primary amine including the perfluoropolyether chain, because both thermal stability and friction properties become more excellent.

The ionic liquid is preferably represented by any of General Formula (1) to General Formula (4) below, and more preferably represented by any of General Formula (3) and General Formula (5) below.

In General Formula (1) to General Formula (5) above, m is an integer of 1 to 10 and preferably an integer of 1 to 6; and n is an integer of 2 to 10 and preferably an integer of 2 to 6.

In General Formula (2) and General Formula (4) above, x is an integer of 1 to 20 and preferably an integer of 1 to 10; and y is an integer of 0 to 6 and preferably an integer of 0 to 4.

In General Formula (3), x is an integer of 0 to 21 and preferably an integer of 1 to 10; and y is an integer of 0 to 6 and preferably an integer of 0 to 4. For example, examples of x in General Formula (3) above are the same as examples of x in General Formula (I-1) above.

In General Formula (5) above, x1 and x2 are each independently an integer of 0 to 20 and preferably an integer of 1 to 10. For example, examples of x1 and x2 include examples of x in General Formula (I-1) above.

The lubricant for a magnetic recording medium preferably has a coefficient of dynamic friction that is 0.30 or less. The coefficient of dynamic friction is a coefficient of dynamic friction when an average thickness of the lubricant layer is 10 Å, and is measured by the following test.

—Test—

A friction coefficient against the number of sliding motions is measured using a sample under the following test conditions.

[Test Conditions]

By means of an automatic friction measuring device (manufacturer: Kyowa Interface Science Co., Ltd., type: Triboster TS-501), a measurement is performed under the conditions that a point contact (3 mm-steel ball) is used, a weight is 15 g, a speed is 1.7 mm/sec, a distance is 20 mm, and a repeating time is 100 times.

<Other Components>

Examples of the above-mentioned other components include known lubricants, extreme-pressure agents, anti-rust agents, and solvents.

<<Known Lubricant>>

As the lubricant, the ionic liquid may be used alone, but the ionic liquid may be used in combination with a lubricant known in the art. Examples of the known lubricant include long-chain carboxylic acids, long-chain carboxylic acid esters, perfluoroalkyl carboxylic acid esters, carboxylic acid perfluoroalkyl esters, perfluoroalkyl carboxylic acid perfluoroalkyl esters, and perfluoropolyether derivatives.

<<Extreme-Pressure Agent>>

In order to maintain a lubrication effect under severe conditions, the lubricant for a magnetic recording medium may be used in combination with an extreme-pressure agent at a blending ratio of about 30:70 to about 70:30 based on a mass ratio. The extreme-pressure agent reacts with a metal surface to form a reaction product coating film due to friction heat generated when a metal contact is partially formed in in a boundary lubrication region, to thereby perform a function of preventing friction and abrasion. As the extreme-pressure agent, for example, any of a phosphorous-based extreme-pressure agent, a sulfur-based extreme-pressure agent, a halogen-based extreme-pressure agent, an organic metal-based extreme-pressure agent, or a complex-based extreme-pressure agent can be used.

<<Anti-Rust Agent>>

The anti-rust agent is not particularly limited as long as the anti-rust agent is an anti-rust agent that can be generally used for this type of a magnetic recording medium. Examples of the anti-rust agent include phenols, naphthols, quinones, heterocyclic compounds each including a nitrogen atom, heterocyclic compounds each including an oxygen atom, and heterocyclic compounds each including a sulfur atom. Moreover, the anti-rust agent may be used by blending with a lubricant. Alternatively, the anti-rust agent may be deposited by dividing into 2 or more layers, for example, by forming a magnetic layer on a non-magnetic support, coating the upper part of the magnetic layer with an anti-rust agent layer, followed by coating with a lubricant layer.

<<Solvent>>

Examples of the solvent include organic solvents. Examples of the organic solvents include fluorine-based solvents and alcohol-based solvents. Examples of the alcohol-based solvents include isopropyl alcohol (IPA) and ethanol. These may be used alone or in combination.

(Magnetic Recording Medium)

A magnetic recording medium of the present invention include a non-magnetic support, a magnetic layer, and the lubricant for a magnetic recording medium of the present invention, and may further include other members according to the necessity.

The magnetic layer is formed on or above the non-magnetic support. Specifically, the magnetic layer is arranged on or above the non-magnetic support.

The lubricant for a magnetic recording medium is formed on or above the magnetic layer. Specifically, the lubricant for a magnetic recording medium is arranged on or above the magnetic layer.

The lubricant can be applied for a so-called metal thin film magnetic recording medium, in which a magnetic layer is formed on a surface of a non-magnetic support by a method, such as vapor deposition and sputtering. Moreover, the lubricant can be also applied for a magnetic recording medium having a structure where an undercoat layer is disposed between a non-magnetic support and a magnetic layer. Examples of such a magnetic recording medium include magnetic disks and magnetic tapes.

Figure 1:
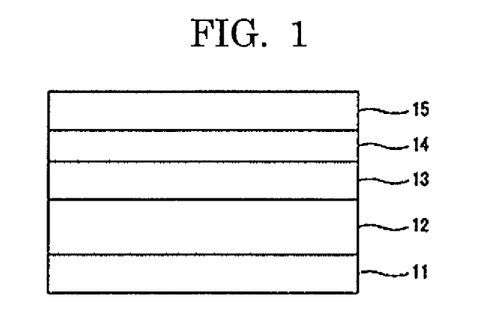
FIG. 1 is a cross-sectional view illustrating one example of a hard disk according to one embodiment of the present invention.

FIG. 1 is a cross-sectional view illustrating one example of a hard disk. The hard disk has a structure where a substrate 11, an undercoat layer 12, a magnetic layer 13, a protective carbon layer 14, and a lubricant layer 15 are sequentially laminated.

Figure 2:
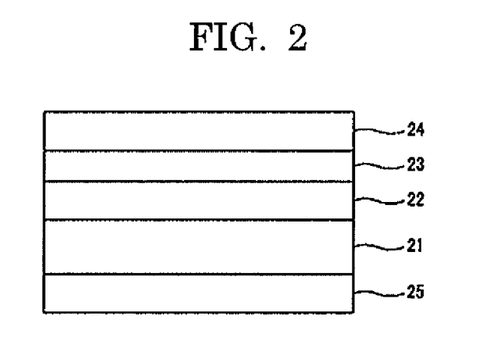
FIG. 2 is a cross-sectional view illustrating one example of a magnetic tape according to one embodiment of the present invention.

Moreover, FIG. 2 is a cross-sectional view illustrating one example of a magnetic tape. The magnetic tape has a structure where a back-coating layer 25, a substrate 21, a magnetic layer 22, a protective carbon layer 23, and a lubricant layer 24 are sequentially laminated.

In the magnetic disk illustrated in FIG. 1, the substrate 11 and the undercoat layer 12 are corresponded to a non-magnetic support. In the magnetic tape illustrated in FIG. 2, the substrate 21 corresponds to a non-magnetic support. When a substrate having rigidity, such as an Al alloy plate and a glass plate, is used as a non-magnetic support, a surface of the substrate may be hardened by forming an oxide film formed by anodizing, or a Ni—P coating on the surface of the substrate.

Each of the magnetic layers 13 and 22 is formed as a continuous film by a method, such as plating, sputtering, vacuum deposition, and plasma CVD. Examples of the magnetic layers 13 and 22 include: longitudinal magnetic recording metal magnetic films formed of metals (e.g., Fe, Co, and Ni), Co—Ni-based alloys, Co—Pt-based alloys, Co—Ni—Pt-based alloys, Fe—Co-based alloys, Fe—Ni-based alloys, Fe—Co—Ni-based alloys, Fe—Ni—B-based alloys, Fe—Co—B-based alloys, or Fe—Co—Ni—B-based alloys; and perpendicular magnetic recording metal magnetic thin films, such as Co—Cr-based alloy thin films, and Co—O-based thin films.

In the case where a longitudinal magnetic recording metal magnetic thin film is formed, particularly, a non-magnetic material, such as Bi, Sb, Pb, Sn, Ga, In, Ge, Si, and Tl, is formed as a base layer 12 on a non-magnetic support in advance, and a metal magnetic material is deposited through vapor deposition or sputtering in a perpendicular direction to diffuse the non-magnetic material into the magnetic metal thin film, to thereby improve a coercive force as well as eliminating orientation to assure in-plane isotropy.

Moreover, a hard protective layer, such as a carbon film, a diamond-like carbon film, a chromium oxide film, and SiO2 film, may be formed on a surface of the magnetic layer 13 or 22.

Examples of a method for making such a metal film magnetic recording medium retain the lubricant for a magnetic recording medium include a method for top-coating a surface of the magnetic layer 13 or 22, or a surface of the protective layer 14 or 23 with the lubricant, as illustrated in FIGS. 1 and 2. A coating amount of the lubricant is preferably from 0.1 mg/m$^2$ to 100 mg/m$^2$, more preferably from 0.5 mg/m$^2$ to 30 mg/m$^2$, and particularly preferably from 0.5 mg/m$^2$ to 20 mg/m$^2$.

As illustrated in FIG. 2, moreover, a metal thin film magnetic tape may optionally have a back-coating layer 25, other than a metal magnetic thin film, which is the magnetic layer 22.

The back-coating layer 25 is formed by adding a carbon-based powder for imparting conductivity, or an inorganic pigment for controlling a surface roughness to a resin binder, and applying the resin binder mixture.

As another embodiment, moreover, the lubricant can be applied for a so-called coating-type magnetic recording medium, in which a magnetic coating film is formed as a magnetic layer by applying a magnetic coating material onto a surface of a non-magnetic support. In the coating-type magnetic recording medium, the non-magnetic support, a magnetic powder constituting the magnetic coating film, and the resin binder for use can be selected from any of those known in the art.

Examples of the non-magnetic support include: polymer supports formed by polymer materials, represented by polyesters, polyolefins, cellulose derivatives, vinyl-based resins, polyimides, polyamides, polycarbonates, etc.; metal substrates formed of aluminium alloys, titanium alloys, etc.; ceramic substrates formed of alumina glass, etc.; and glass substrates. Moreover, a shape of the non-magnetic support is not particularly limited, and may be any form, such as a tape shape, a sheet shape, and a drum shape. Moreover, the non-magnetic support may be subjected to a surface treatment by which fine irregularities are formed, in order to control the surface texture of the non-magnetic support.

Examples of the magnetic powder include: ferromagnetic iron oxide-based particles, such as γ-Fe$_2$O$_3$, and cobalt-coated γ-Fe$_2$O$_3$; ferromagnetic chromium dioxide-based particles; ferromagnetic metal-based particles formed of a metal, such as Fe, Co, and Ni, or an alloy containing any of the above-listed metals; and hexagonal ferrite particles in the form of hexagonal plates.

Examples of the resin binder include: polymers, such as vinyl chloride, vinyl acetate, vinyl alcohol, vinylidene chloride, acrylic acid ester, methacrylic acid ester, styrene, butadiene, and acrylonitrile; copolymers combining two or more selected from the above-listed polymers; polyurethane resins; polyester resins; and epoxy resins. In order to improve dispersibility of the magnetic powder, a hydrophilic polar group, such as a carboxylic acid group, a carboxyl group, and a phosphoric acid group, may be introduced into any of the above-listed binders.

Other than the magnetic powder and the resin binder, additives, such as a dispersing agent, an abrasive, an anti-static agent, and an anti-rust agent, may be added to the magnetic coating film.

As a method for making the coating-type magnetic recording medium retain the lubricant for a magnetic recording medium, there are a method where the lubricant is internally added to the magnetic layer constituting the magnetic coating film formed on the non-magnetic support, a method where the lubricant is applied on a surface of the magnetic layer as top coating, and a combination of the above-listed methods. In the case where the lubricant for a magnetic recording medium is internally added into the magnetic coating film, the lubricant is added in an amount of from 0.2 parts by mass to 20 parts by mass relative to 100 parts by mass of the resin binder.

In the case where a surface of the magnetic layer is top-coated with the lubricant for a magnetic recording medium, moreover, a coating amount of the lubricant is preferably from 0.1 mg/m$^2$ to 100 mg/m$^2$, and more preferably from 0.5 mg/m$^2$ to 20 mg/m$^2$. As a deposition method in the case where the lubricant for a magnetic recording medium is applied as top coating, the ionic liquid is dissolved in a solvent, and the obtained solution may be applied or sprayed, or a magnetic recording medium may be dipped in the solution.

The solvent is preferably a fluorine-based solvent. Examples of the fluorine-based solvent include hydrofluoro ethers [e.g., $C_3F_7OCH_3$, $C_4F_9OCH_3$, $C_4F_9OC_2H_5$, $C_2F_5CF(OCH_3)C_3F_7$, and $C_5H_2F_{10}$].

The fluorine-based solvent may be a commercial product. Examples of the commercial product include: Novec™ 7000, 7100, 7200, 7300, and 71IPA available from 3M Company; and Vertrel XF and X-P10 available from Du Pont-Mitsui Fluorochemicals Company, Ltd.

Use of the lubricant for a magnetic recording medium of the present invention can exhibit excellent a lubrication effect to reduce a friction coefficient and can obtain high thermal stability even when a lubricant layer having a small thickness is formed. Moreover, the lubrication effect is not impaired even under severe conditions, such as high temperatures, low temperatures, high humidity, and low humidity.

Accordingly, a magnetic recording medium, to which the lubricant for a magnetic recording medium is applied, exhibits excellent running performances, antifriction properties, durability, etc., owing to a lubrication effect, even when a lubricant layer having a small thickness is formed, and moreover can improve thermal stability.

EXAMPLES

Specific examples of the present invention are explained below. In Examples, ionic liquids were synthesized and solubility of the ionic liquids to a fluorine-based solvent were measured. Moreover, thermal decomposition temperatures of the ionic liquids were measured. Moreover, lubricants each including the ionic liquid were produced, and friction coefficients of the lubricants were measured. Note that, the present invention is not limited to Examples below.

Example 1

Synthesis of PFTEG Amine-PFTEG Sulfonic Acid Salt

<<Step 1-1>>

A flask equipped with a stirrer, a thermometer, and a cooling tube was charged with 21.9 g (40.0 mmol) of fluorinated triethylene glycol monobutyl ether (PFTEG-OH) (manufacturer: FluoroChem) and 18.9 g (80.0 mmol) of 2-chloroethyltosylate (manufacturer: Tokyo Chemical Industry Co., Ltd.), followed by adding 40 g of m-xylene-hexafluoride (manufacturer: Wako Pure Chemical Industries, Ltd.) as a solvent. The resultant was stirred at room temperature. During stirring, 11.1 g (80.3 mmol) of potassium carbonate (manufacturer: Wako Pure Chemical Industries, Ltd.) and 1.1 g of a 40% tetrabuytylammonium hydroxide aqueous solution (manufacturer: Tokyo Chemical Industry Co., Ltd.) were added, and the resultant was heated and stirred for 15 hours at 80° C. To the reaction solution, water and Novec 7100 (manufacturer: Sumitomo 3M Limited) were added, the resultant was partitioned and extracted, and the Novec layer was concentrated by an evaporator, to thereby obtain 38.3 g of a chloroethylated PFTEG solution of a colorless transparent liquid.

The scheme of the reaction above is presented below.

<<Step 1-2>>

A flask equipped with a stirrer, a thermometer, and a cooling tube was charged with 37.3 g of the chloroethylated PFTEG solution synthesized in Step 1-1, 28.37 g (153 mmol) of potassium phthalimide (manufacturer: Tokyo Chemical Industry Co., Ltd.), 0.3 g of sodium iodide (manufacturer: Wako Pure Chemical Industries, Ltd.), and 1.68 g (6.3 mmol) of 18-crown-6-ether (manufacturer: Aldrich), followed by adding 118 g of DMF (N,N-dimethylformamide, manufacturer: KANTO CHEMICAL CO., INC.) as a solvent. The resultant was stirred for 13 hours at 80° C. After concentrating the reaction solution by an evaporator, the resultant was partitioned and extracted in a water/Novec 7100 system to take an organic layer out. The organic layer was further washed twice with a 0.2 M sodium hydroxide aqueous solution, and the obtained organic layer was dried with magnesium sulfate. After removing the magnesium sulfate through filtration, the resultant was concentrated by an evaporator, followed by drying under the reduced pressure, to thereby obtain a phthalimide product at a yield of 90% (including Step 1-1).

The scheme of the reaction above is presented below.

A structure of the synthesized phthalimide product was confirmed by H-NMR is (in deuterated chloroform), FT-IR, and GC-MS.

As a result of H-NMR (in deuterated chloroform), peaks derived from an aromatic ring in phthalimide and from a hydrocarbon chain were confirmed, since the peak positions

δ were 7.8 ppm, 7.7 ppm, and 3.9 ppm-3.7 ppm, and the match of the integration ratio was confirmed.

It could be confirmed from FT-IR that a peak derived from a carbonyl group in the phthalimide side was generated at 1,711 cm$^{-1}$ and 1,774 cm$^{-1}$, and the synthesis of the phthalimide product was confirmed.

<<Step 1-3>>

A flask equipped with a stirrer, a Y-shaped tube, a thermometer, and a cooling tube was charged with 24.5 g (34 mmol) of the phthalimide product synthesized in Step 1-2, 54 g (1.08 mol) of hydrazine hydrate (manufacturer: Wako Pure Chemical Industries, Ltd.), and 110 mL of ethanol. Thereafter, the resultant was stirred for 14 hours with performing reflux (70° C. or higher). To the obtained liquid, Novec 7100 was added. The resultant was partitioned and washed 3 times using a 1 mol/L sodium hydroxide aqueous solution. After dehydrating the obtained Novec layer with sodium sulfate, filtration was performed to obtain a solution of a target. After filtering the obtained solution with a membrane filter formed of polypropylene (PP) having a pore diameter of 0.2 μm, the resultant was concentrated to thereby obtain 23.4 g of an amino product (PFTEG amine).

The scheme of the reaction above is presented below.

The disappearance of the peak derived from PFTEG phthalimide was confirmed by GC-MS analysis, and it was found that the obtained amine was a solution including Novec 7100 (11% by mass) and PFTEG-OH (8% by mass).

It was confirmed by FT-IR that the peaks derived from the carbonyl group in the phthalimide site presented at 1,711 cm$^{-1}$ and 1,774 cm$^{-1}$ were completely disappeared, and a peak derived from NH of amine was generated at around 3,600 cm$^{-1}$ to around 3,100 cm$^{-1}$. Therefore, the synthesis of the amino product was confirmed.

<<Step 2-1>>

A three-necked flask equipped with a stirrer, a therniometer, a reflux condenser, and a dropping funnel was charged with 90 g of tertiary butanol (manufacturer: KANTO CHEMICAL CO., INC.) and 7.42 g (66.3 mmol) of potassium tertiary butoxide (manufacturer: Tokyo Chemical Industry Co., Ltd.). With stirring the resultant mixture at room temperature, 29.9 g (55 mmol) of PFTEG-OH was gradually added by dripping from the dropping funnel. Even after the dripping, the resultant was stirred at room temperature. One hour after the dripping, 8.08 g (66.2 mmol) of 1,3-propanesultone (manufacturer: Tokyo Chemical Industry Co., Ltd.) and 10 g of tertiary butanol were gradually added by dripping, and the resultant mixture was stirred for 4 hours after the dripping with maintaining the liquid temperature to 65° C. The obtained reaction solution was concentrated, to thereby obtain a crude product of PFTEG sulfonic acid at a yield of 98%.

The scheme of the reaction above is presented below.

<<Step 2-2>>

In a flask equipped with a stirrer, 7 g of the crude product of PFTEG sulfonic acid obtained in Step 2-1 was dissolved in 60 g of water. To the solution, 40 g of concentrated hydrochloric acid and 100 g of Novec 7200 (manufacturer: Sumitomo 3M Limited) were added, followed by taking the Novec layer out. The Novec layer was concentrated by an evaporator to thereby obtain PFTEG sulfonic acid at a yield of 64%.

The scheme of the reaction above is presented below.

The structure of the synthesized PFTEG sulfonic acid was confirmed by H-NMR (in deuterated methanol). The positions of peaks H-NMR (CD$_3$OD) δ were 3.9 ppm, 3.7 ppm, 2.9 ppm, and 2.1 ppm (α, γ, δ, and ε relative to a PFTEG chain), and the integration ratio was also matched with a calculated value. Therefore, the synthesis of PFTEG sulfonic acid was confirmed.

<<Step 3>>

A flask equipped with a stirrer and a cooling tube was charged with 10.552 g (12.3 mmol) of an about 69% solution of PFTEG amine synthesized in the same manner as in Step 1-3, 8.936 g (13.33 mmol) of PFTEG sulfonic acid synthesized in the same manner as in Step 2-2, and 50 g of Novec 7100 serving as a solvent, and the resultant was stirred for 3 hours at room temperature. After concentrating the obtained solution by an evaporator, refining was performed through decantation using various solvents (water, ether, acetone, and hexane). The washing was regarded as being completed when small amounts of the washing liquid and a solution of a target were deposited on pH testing paper and the pH was determined as 7. After the washing the target was dried under the reduced pressure, to thereby obtain pale yellow PFTEG amine-PFTEG sulfonic acid salt (the following structural formula) at a yield of 44%.

Example 2

Synthesis of 1H,1H,2H,2H-perfluorodecylamine-PFTEG sulfonic Acid Salt

A recovery flask was charged with 4.36 g (6.5 mmol) of PFTEG sulfonic acid synthesized in the same manner as in Step 2-2 of Example 1, 3.61 g (7.8 mmol) of 1H,1H,2H,2H-perfluorodecylamine (manufacturer: Apollo Scientific), and 50 g of Novec 7200. Thereafter, a stirrer and a cooling tube were attached to the flask, and the resultant mixture was stirred for 2 hours at room temperature. Thereafter, the resultant was concentrated by an evaporator, and refining was performed through decantation with ether and hexane. The solids precipitated by the washing were collected through filtration, followed by drying under the reduced pressure, to thereby obtain 7.06 g of pale yellow 1H,1H,2H,2H-perfluorodecylamine-PFTEG sulfonic acid salt (the following structural formula) at a yield of 96%.

Example 3

Synthesis of PFTEG amine-perfluorobutanesulfonic Acid Salt

A flask equipped with a cooling tube was charged with 6.68 g (7.80 mmol) of an about 69% solution of PFTEG amine synthesized in the same manner as in Step 1-3 of Example 1 and 2.39 g (7.97 mmol) of perfluorobutane sulfonic acid (manufacturer: Tokyo Chemical Industry Co., Ltd.), followed by adding 15 g of Novec 7100 as a solvent. The resultant was stirred for 2 hours at room temperature. Thereafter, the resultant was concentrated by an evaporator, and the resultant was refined through decantation with a mixed solution of ether:hexane [1:1 (mass ratio)], and water. Since the pH of the washing liquid and the solution of the target were confirmed to be 7 with pH testing paper after the washing, the solution of the target was dried under the reduced pressure, to thereby obtain pale yellow PFTEG amine-perfluorobutane sulfonic acid salt (the following structural formula) at a yield of 68%.

Example 4

Synthesis of 1H,1H,2H,2H-perfluorodecylamine-perfluoro-3,6,9-trioxatridecanoic Acid Salt

A flask equipped with a cooling tube was charged with 6.94 g (15 mmol) of 1H,1H,2H,2H-perfluorodecylamine (manufacturer: Apollo Scientific) and 5.64 g (7.97 mmol) of perfluoro-3,6,9-trioxatridecanoic acid (manufacturer: Synquest), followed by adding 15 g of Novec 7100 as a solvent. The resultant was stirred for 2 hours at room temperature. Thereafter, the resultant was concentrated by an evaporator, and the resultant was refined through decantation with a mixed solution of ether:hexane [1:1 (mass ratio)], and hexane. Since the pH of the washing liquid and the solution of the target were confirmed to be 7 with pH testing paper after the washing, the solution of the target was dried under the reduced pressure, to thereby obtain brown 1H,1H,2H,2H-perfluorodecylamine-perfluoro-3,6,9-trioxatridecanoic acid salt (the following structural formula) at a yield of 99%.

Example 5

Synthesis of PFTEG amine-bis(perfluorobutanesulfonyl)imidic Acid Salt

A flask equipped with a cooling tube was charged with 6.68 g (7.80 mmol) of an about 69% solution of PFTEG amine synthesized in the same manner as in Step 1-3 of Example 1 and 4.63 g (7.97 mmol) of bis(perfluorobutanesulfonyl)imide (manufacturer: Wako Pure Chemical Industries, Ltd.), followed by adding 100 g of Novec 7100 as a solvent. The resultant was stirred for 2 hours at room temperature. Thereafter, the resultant was concentrated by an evaporator, and the resultant was refined through to decantation with a mixed solution of ether:hexane [1:1 (mass ratio)] and water. Since the pH of the washing liquid and the solution of the target were confirmed to be 7 with pH testing paper after the washing, the solution of the target was dried under the reduced pressure, to thereby obtain pale yellow PFTEG amine-bis(perfluorobutanesulfonyl)imide salt (the following structural formula) at a yield of 85%.

Comparative Example 1

Synthesis of octylamine-PFTEG sulfonic Acid Salt

A flask equipped with a cooling tube was charged with 3.35 g (5.00 mmol) of PFTEG sulfonic acid synthesized in the same manner as in Step 2-2 of Example 1 and 0.67 g (5.15 mmol) of octylamine (manufacturer: Wako Pure Chemical Industries, Ltd.), followed by adding 35 g of Novec 7200. The resultant was stirred for 2 hours at room temperature. Thereafter, the resultant was concentrated by an evaporator, and the resultant was refined through decantation with hexane. Since the pH of the washing liquid and the solution of the target were confirmed to be 7 with pH testing paper after the washing, the solution of the target was dried under the reduced pressure, to thereby obtain white PFTEG amine-perfluorobutane sulfonic acid salt (the following structure) at a yield of 58%.

Comparative Example 2

Synthesis of 1H,1H,2H,2H-perfluorodecylamine-perfluorobutane sulfonic Acid Salt

A flask equipped with a cooling tube was charged with 6.94 g (15 mmol) of 1H,1H,2H-perfluorodecylamine (manufacturer: Apollo Scientific) and 3.6 g (12 mmol) of perfluorobutane sulfonic acid (manufacturer: Tokyo Chemical Industry Co., Ltd.), followed by adding 200 g of a mixed solvent of hexane:ethanol:Novec 7200 [1:1:1 (mass ratio)]. The resultant was stirred for 4 hours at room temperature. Thereafter, the resultant was concentrated by an evaporator, and the resultant was refined through decantation 3 times with a mixed solution of hexane:ethanol [10:1 (mass ratio)], and hexane. Thereafter, the solution of the target was dried under the reduced pressure, to thereby obtain brown 1H,1H,2H,2H-perfluorodecylamine-perfluorobutane sulfonic acid salt (the following structural formula) at a yield of 83%.

Comparative Example 3

Synthesis of octadecylamine-perfluoroheptanoic Acid Salt

A flask equipped with a cooling tube was charged with 4.8. g (18 mmol) of octadecylamine (manufacturer: Wako Pure Chemical Industries, Ltd.) and 5.5 g (15 mmol) of perfluoroheptanoic acid (manufacturer: Tokyo Chemical Industry Co., Ltd.), followed by adding 200 g of a mixed solvent of hexane:ethanol [1:1 (mass ratio)] as a solvent. The resultant was stirred for 4 hours at room temperature. Thereafter, the resultant was concentrated by an evaporator, and recrystallization was performed using a mixed solvent of hexane:ethanol [8:2 (mass ratio)]. Thereafter, vacuum filtration and drying under the reduced pressure were performed to thereby obtain white octadecylamine-perfluorobutane sulfonic acid salt (the following structural formula) at a yield of 75%.

Comparative Example 4

PFPE Diol Having Molecular Weight of about 2,000

Fomblin Z-Dol (manufacturer: Solvay Specialty Polymers, the following structural formula) (molecular weight: about 2,000) was used.

<Evaluation>

The following evaluations were performed using the ionic liquids obtained in Examples 1 to 5 and Comparative Examples 1 to 3. The results are presented in Table 1-1 and Table 1-2.

<<Measurement of Thermal Decomposition Temperature>>

A weight reduction relative to a temperature was measured by means of TG-DTA (manufacturer: Seiko Instruments Inc., Type: EXSTAR6000), and the 5% weight reduction temperature was determined as a thermal decomposition temperature. As measuring conditions, the heating speed was 10° C./min and the air flow rate was 200 mL/min.

<<Solubility to Fluorine-Based Solvent>>

Various fluorine-based solvents were each added in a manner that a concentration was to be 1% by mass, and the resultant was stirred with maintaining the temperature at 25° C. The solubility was evaluated based on the following evaluation criteria.

[Evaluation Criteria]

1: The ionic liquid was dissolved in the fluorine-based solvent, and no precipitation was generated even after leaving the solution to stand.
2: The ionic liquid was insoluble to the fluorine-based solvent, or was partially dissolved but precipitation was generated when the solution was left to stand.

<<Friction Properties>>

—Production of Lubricant-Coated Hard Disk—

A magnetic disk having a cross-sectional structure as illustrated in FIG. 1 was produced. A lubricant solution used for dip coating was prepared by using each of solvents presented in Table 1-1 and Table 1-2, and dissolving each of the lubricants in the solvent. In the case where the lubricant solution was clouded, the lubricant solution was filtered using a syringe filter (0.2 μm).

The dip coating was performed by pulling out the magnetic disk from a glass container charged with the lubricant solution at the speed of 50 mm/min.

The dip concentration condition of each lubricant was systematically changed to determine dependency of a film thickness to the dip concentration. The film thickness was measured by means of ellipsometry (type: M-2000, manufacturer: J. A. Woollam Co., Ltd.). The average thickness of the lubricant layer formed by adjusting the dip concentration of each lubricant was adjusted to be 10 Å.

—Test—

A friction coefficient against the number of sliding motions was measured using the produced sample under the following test conditions, to thereby evaluate friction properties.

[Test Conditions]

The measurement was performed by means of an automatic friction measuring device (manufacturer: Kyowa Interface Science Co., Ltd., type: Triboster TS-501) under the conditions that a point contact (3 mm-steel ball) was used, a weight was 15 g, a speed was 1.7 mm/sec, a distance was 20 mm, and a repeating time was 100 times.

<<Comprehensive Evaluation>>

The results of the evaluations above were ranked as presented below, and moreover, a comprehensive evaluation was performed according to the evaluation criteria below.

[Ranking 1: thermal decomposition temperature]
I: 300° C. or higher
II: 150° C. or higher but lower than 300° C.
III: lower than 150° C.

[Ranking 2: friction properties]
I: The friction coefficient when the number of the sliding motions was 100 times was less than 0.20.
II: The friction coefficient when the number of the sliding motions was 100 times was 0.20 or greater but 0.30 or less.
III: The friction coefficient when the number of the sliding motions was 100 times was greater than 0.30.

[Evaluation Criteria]
I: The results were two I in Ranking 1 and Ranking 2, and the result of the solubility to the fluorine-based solvent was 1 with all of the solvents.
II: The results were one I and one II, or two II in Ranking 1 and Ranking 2, and the result of the solubility to the fluorine-based solvent was 1 with all of the solvents.
III: The results include one or two III in Ranking 1 and Ranking 2, and/or the result of the solubility to the fluorine-based solvent was 2 with at least one of the solvents.

TABLE 1-1

|  |  | Ex. 1 | Ex. 2 | Ex. 3 | Ex. 4 | Ex. 5 |
|---|---|---|---|---|---|---|
| Acid |  | PFTEG sulfonic acid | PFTEG sulfonic acid | Perfluoro Butane sulfonic acid | PFTEG carboxylic acid | Bis(perfluoro-butane sulfonyl)imide |
|  | Structure | monoanion | monoanion | monoanion | monoanion | monoanion |
|  | Number average molecular weight of fluorine-containing chain | 500 | 500 | 200 | 500 | 440 |
| Base |  | PFTEG amine | Perfluoro decylamine | PFTEG amine | Perfluoro decylamine | PFTEG amine |
|  | Structure | monocation | monocation | monocation | monocation | monocation |
| Thermal decomposition (5% weight reduction) temperature (° C.) |  | 246 | 254 | 302 | 169 | 291 |
| Solubility to fluorine-based solvent | Novec 7100 | 1 | 1 | 1 | 1 | 1 |
|  | Novec 7200 | 1 | 1 | 1 | 1 | 1 |
|  | Novec 7300 | 1 | 1 | 1 | 1 | 1 |
|  | Vertrel XF | 1 | 1 | 1 | 1 | 1 |
| Friction coefficient | Dip solvent | Vertrel XF | Vertrel XF | Vertrel XF | Vertrel XF | Vertrel XF |
|  | Sliding time 1 | 0.18 | 0.15 | 0.18 | 0.16 | 0.16 |
|  | 50 | 0.26 | 0.15 | 0.18 | 0.17 | 0.17 |
|  | 100 | 0.28 | 0.16 | 0.19 | 0.18 | 0.17 |
| Comprehensive evaluation |  | II | II | I | II | II |

TABLE 1-2

|  |  | Comp. Ex. 1 | Comp. Ex. 2 | Comp. Ex. 3 | Comp. Ex. 4 |
|---|---|---|---|---|---|
| Acid |  | PFTEG sulfonic acid | Perfluoro butane sulfonic acid | Perfluoro heptanoic acid | PFPE diol (Z-Dol) |
|  | Structure | monoanion | monoanion | monoanion | — |
|  | Number average molecular weight of fluorine-containing chain | 500 | 200 | 400 | 2,000 |
| Base |  | Octylamine | Perfluoro decylamine | Stearyl amine | — |
|  | Structure | monocation | monocation | monocation | — |
| Thermal decomposition (5% weight reduction) temperature (° C.) |  | 276 | 308 | 204 | 179 |
| Solubility to fluorine-based solvent | Novec 7100 | 1 | 2 | 2 | 1 |
|  | Novec 7200 | 1 | 2 | 2 | 1 |
|  | Novec 7300 | 1 | 2 | 2 | 1 |
|  | Vertrel XF | 1 | 2 | 2 | 1 |

TABLE 1-2-continued

|  |  | Comp. Ex. 1 | Comp. Ex. 2 | Comp. Ex. 3 | Comp. Ex. 4 |
|---|---|---|---|---|---|
| Friction coefficient | Dip solvent | EtOH/Hexane | EtOH/Hexane | EtOH/Hexane | Vertrel XF |
|  | Sliding time 1 | 0.18 | 0.25 | 0.55 | 0.29 |
|  | 50 | 0.44 | 0.31 | 0.53 | 0.63 |
|  | 100 | 0.55 | 0.40 | 0.33 | 0.53 |
| Comprehensive evaluation |  | III | III | III | III |

Each of the fluorine-based solvents in Table 1-1 and Table 1-2 is as follows.

Novec™ 7100: hydrofluoroether ($C_4F_9OCH_3$), available from 3M Company

Novec™ 7200: hydrofluoroether ($C_4F_9OC_2H_5$), available from 3M Company

Novec™ 7300: hydrofluoroether [$C_2F_5CF(OCH_3)C_3F_7$], available from 3M Company Vertrel XF: $C_5H_2F_{10}$, available from Du Pont-Mitsui Fluorochemicals Company, Ltd.

Since the lubricants of Comparative Examples 1 to 3 were not soluble in a fluorine-based solvent, an ethanol/hexane mixed solvent (ethanol/hexane=3/7 (mass ratio)) was used as a solvent.

Looking at the friction coefficients of Examples 1 to 5, the friction coefficients were maintained 0.30 or lower even when the number of sliding motions was 100 times.

In Comparative Examples 1 to 4, on the other hand, the friction coefficients were greater than 0.30 when the number of sliding motions was 50 times or greater.

Example 3 was more excellent in terms of both thermal stability and the friction coefficient.

INDUSTRIAL APPLICABILITY

Since the lubricant for a magnetic recording medium of the present invention has excellent thermal stability and friction properties even when a thickness of a lubricant layer formed is thin, the lubricant can be suitably used for a magnetic recording medium of high recording density.

REFERENCE SIGNS LIST 11 substrate
12 undercoat layer
13 magnetic layer
14 protective carbon layer
15 lubricant layer
21 substrate
22 magnetic layer
23 protective carbon layer
24 lubricant layer
25 back-coating layer

The invention claimed is:

1. A lubricant for a magnetic recording medium, comprising:
an ionic liquid including a Bronsted acid and a Bronsted base that is primary amine as constituents of the ionic liquid,
wherein the Bronsted acid includes a fluorine-containing chain,
wherein the Bronsted base includes a fluorine-containing chain that is a perfluoroalkyl chain or a perfluoropolyether chain,
wherein the fluorine-containing chain in the Bronsted acid is a perfluoropolyether chain or the fluorine-containing chain in the Bronsted base is the perfluoropolyether chain, or the fluorine-containing chain in the Bronsted acid is the perfluoropolyether chain and the fluorine-containing chain in the Bronsted base is the perfluoropolyether chain, and
wherein a number average molecular weight of the fluorine-containing chain in the Bronsted acid is 1,500 or less.

2. The lubricant for a magnetic recording medium according to claim 1,
wherein the number average molecular weight of the fluorine-containing chain in the Bronsted acid is 500 or less.

3. The lubricant for a magnetic recording medium according to claim 1,
wherein the Bronsted acid is sulfonic acid including the fluorine-containing chain or sulfonyl imide including the fluorine-containing chain, and
wherein the Bronsted base is primary amine including the perfluoropolyether chain.

4. The lubricant for a magnetic recording medium according to claim 1,
wherein a coefficient of dynamic friction of the lubricant is 0.30 or less.

5. A magnetic recording medium comprising:
a non-magnetic support;
a magnetic layer on or above the non-magnetic support; and
the lubricant for a magnetic recording medium according to claim 1, on or above the magnetic layer.

* * * * *